US010116258B2

(12) United States Patent
Hendricks et al.

(10) Patent No.: US 10,116,258 B2
(45) Date of Patent: Oct. 30, 2018

(54) TEMPERATURE-STAGED THERMAL ENERGY STORAGE ENABLING LOW THERMAL EXERGY LOSS REFLUX BOILING IN FULL SPECTRUM SOLAR ENERGY SYSTEMS

(71) Applicant: CALIFORNIA INSTITUTE OF TECHNOLOGY, Pasadena, CA (US)

(72) Inventors: Terry Hendricks, Pasadena, CA (US); Bill J. Nesmith, Pasadena, CA (US); Juan Cepeda-Rizo, Long Beach, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 77 days.

(21) Appl. No.: 15/381,698

(22) Filed: Dec. 16, 2016

(65) Prior Publication Data
US 2017/0179879 A1 Jun. 22, 2017

Related U.S. Application Data

(60) Provisional application No. 62/270,193, filed on Dec. 21, 2015.

(51) Int. Cl.
*F03G 3/00* (2006.01)
*F03G 6/00* (2006.01)
(Continued)

(52) U.S. Cl.
CPC .............. *H02S 40/44* (2014.12); *F03G 3/00* (2013.01); *F03G 6/001* (2013.01); *F03G 6/06* (2013.01); *F03G 6/065* (2013.01); *F24S 20/20* (2018.05); *F24S 80/20* (2018.05); *F28D 20/02* (2013.01); *F28D 20/023* (2013.01); *H02S 40/40* (2014.12);
(Continued)

(58) Field of Classification Search
CPC .......... H02S 40/40; H02S 40/44; F24S 20/20; Y02E 10/40; Y02E 10/44; Y02E 10/46; Y02E 10/50; Y02E 10/52
See application file for complete search history.

(56) References Cited

U.S. PATENT DOCUMENTS

| 4,002,031 A | * | 1/1977 | Bell | ........................ F03G 6/001 126/698 |
| 2004/0128999 A1 | * | 7/2004 | Bronicki | ................. F01K 13/02 60/646 |

(Continued)

OTHER PUBLICATIONS

Hendricks, T. J., et al. "Temperature-Staged Thermal Energy Storage Enabling Low Thermal Exergy Loss Reflux Boiling in Full Spectrum Solar Systems." *ASME. ASME International Mechanical Engineering Congress and Exposition*, vol. 6B: Energy, V06BT08A031, (Nov. 2016). 11 pages.

(Continued)

*Primary Examiner* — Lindsey A Bernier
(74) *Attorney, Agent, or Firm* — Steinfl + Bruno, LLP

(57) ABSTRACT

The efficiency of solar power collection is increased by adding a thermal energy storage stage to a sunlight concentrator and thermodynamic power generator system. The thermal energy storage includes tubes or capsules made of a phase change material that stores thermal energy in different temperature stages through a working fluid. The stored thermal energy is directed to the thermodynamic generator during off-sun periods.

13 Claims, 14 Drawing Sheets

(51) Int. Cl.

| | |
|---|---|
| *F03G 6/06* | (2006.01) |
| *F24S 20/20* | (2018.01) |
| *F24S 80/20* | (2018.01) |
| *F28D 20/02* | (2006.01) |
| *H02S 40/40* | (2014.01) |
| *H02S 40/44* | (2014.01) |

(52) U.S. Cl.
CPC ............... *Y02E 10/40* (2013.01); *Y02E 10/41* (2013.01); *Y02E 10/44* (2013.01); *Y02E 10/46* (2013.01); *Y02E 10/50* (2013.01); *Y02E 10/52* (2013.01); *Y02E 60/145* (2013.01); *Y02E 70/30* (2013.01)

(56) References Cited

U.S. PATENT DOCUMENTS

| | | | | |
|---|---|---|---|---|
| 2010/0006087 | A1* | 1/2010 | Gilon | F24J 2/07 |
| | | | | 126/572 |
| 2011/0259544 | A1* | 10/2011 | Neti | F28D 20/023 |
| | | | | 165/10 |
| 2013/0105106 | A1* | 5/2013 | Goswami | F28D 20/026 |
| | | | | 165/10 |
| 2013/0111894 | A1* | 5/2013 | Agnon | F03G 7/002 |
| | | | | 60/516 |

OTHER PUBLICATIONS

Hendricks, T. J., et al. "Temperature-Staged Thermal Energy Storage Enabling Low Thermal Exergy Loss Reflux Boiling in Full Spectrum Solar Systems." Presentation at *ASME 2016 International Mechanical Engineering Congress & Exposition*, IMECE16, (Nov. 2016). 19 pages.

* cited by examiner

TEMPERATURE-STAGED THERMAL ENERGY STORAGE ENABLING LOW THERMAL EXERGY LOSS REFLUX BOILING IN FULL SPECTRUM SOLAR ENERGY SYSTEMS

CROSS REFERENCE TO RELATED APPLICATIONS

The present application claims priority to U.S. Provisional Patent Application No. 62/270,193, filed on Dec. 21, 2015, the disclosure of which is incorporated herein by reference in its entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to solar power generation. More particularly, it relates to methods to temperature-staged thermal energy storage enabling low thermal energy loss reflux boiling in full spectrum solar energy systems.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
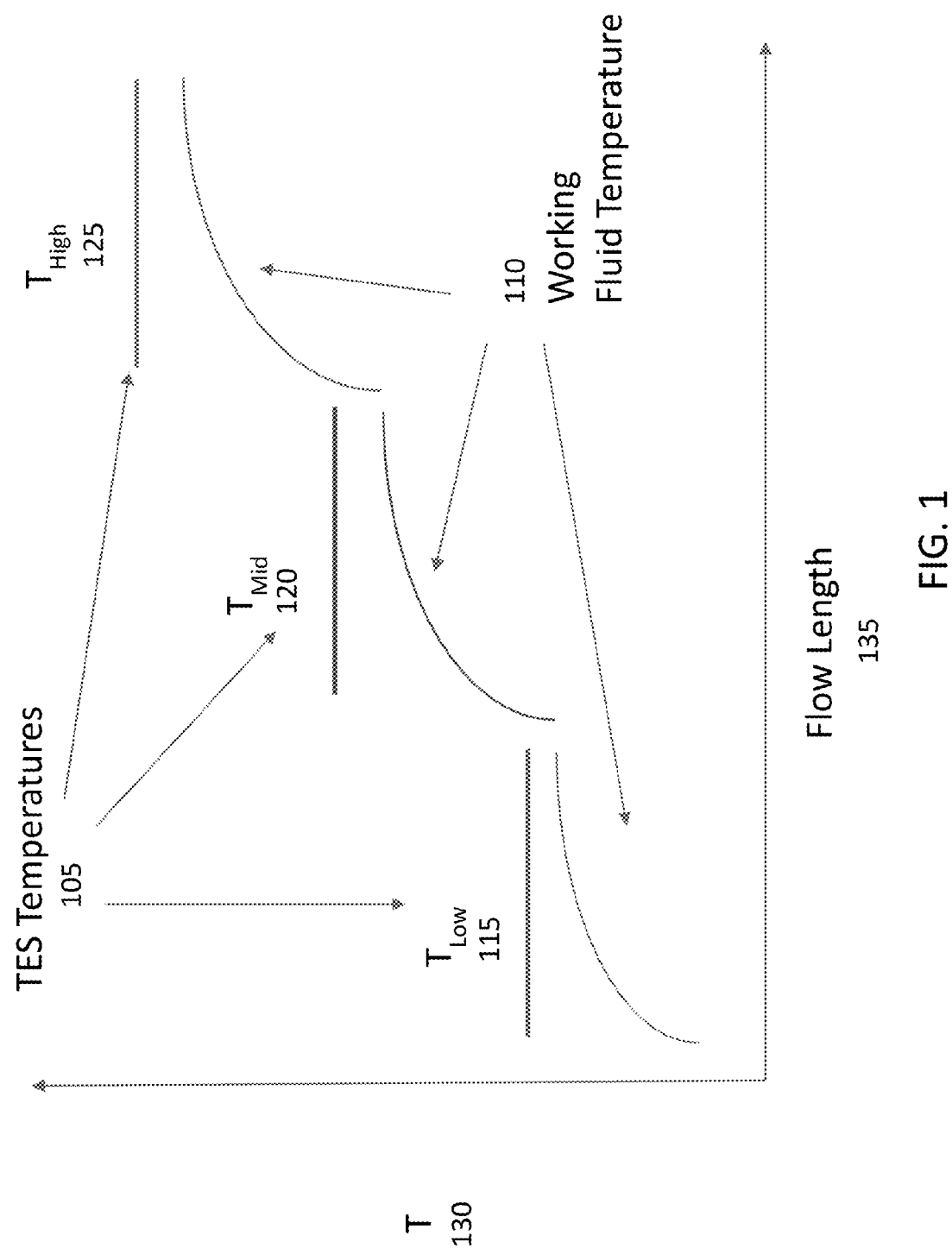
FIG. 1 illustrates a graph with temperature stages.

In a first aspect of the disclosure, a structure is described, the structure comprising: a photovoltaic module; a reflux boiling chamber configured to store thermal energy, the reflux boiling chamber comprising a plurality of temperature staged thermal energy storage materials, each temperature staged thermal energy storage material comprising a porous phase change material and configured to operate at a different temperature range than other temperature staged thermal energy storage materials, the reflux boiling chamber further configured to contain a working fluid; a thermodynamic heat engine; and a solar concentrator configured to concentrate sunlight towards the photovoltaic module and the reflux boiling chamber, wherein the reflux boiling chamber is further configured to transfer the thermal energy to the thermodynamic heat engine through the working fluid.

DETAILED DESCRIPTION

Hybrid full spectrum solar systems (FSSS) are designed to capture and convert the full solar wavelength spectrum. Such systems can use hybrid solar photovoltaic and thermodynamic cycles that require low thermal energy loss systems. Low thermal energy loss systems are capable of transferring thermal energy at high rates, as well as thermal fluxes with very low temperature differentials and losses. As understood by the person of ordinary skill in the art, in thermodynamics, the energy of a system is the maximum useful work possible during a process that brings the system into equilibrium with a heat reservoir.

One approach to achieve the above capability is to employ high-heat-flux reflux boiling systems that take advantage of high heat transfer boiling and condensation mechanisms. High-temperature thermal energy storage (generally at 300-600° C.) enables reflux boiling systems to simultaneously store thermal energy internally and increase the energy dispatchability of the associated solar system. This capability can increase the power generation profile by several hours per day, such as by 6-10 hours per day. Such increase can be advantageous because advanced solar systems are intermittent by their nature and their electrical generation can be out-of-phase with electric utility power demand. Power system cycling can also reduce efficiency, performance (dispatchability), lifetime, and reliability, thereby decreasing the levelized cost of electricity (LCOE) to unacceptable levels. It can therefore be advantageous to minimize thermal cycling and large temperature swings on hot regions and components of the system.

It is commonly thought, especially within utility companies, that electrical storage (i.e., batteries) is still too expensive to help resolve the above problems. Batteries can also add reliability and lifetime concerns due to extensive cycling requirements.

A parabolic dish solar concentrator reflux boiler receiver was described around 1980 by Robert Pons and Douglas Bruce Osbourne from the Ford Aerospace and Communications Corporation (a Jet Propulsion Laboratory subcontractor). JPL further developed this technology to include better thermal control for short term buffer storage and long term utility multi-hour storage, which has been a long term challenge particularly for parabolic dish solar concentrators due to weight limits at the focal plane. Integrating multiple phase change materials (PCMs) encapsulated in various cylindrical or spherical or other geometries within the pool of the reflux boiling fluid can provide transient thermal storage to minimize degrading impacts of, for example, engine cycles or cycling on/off or high/low output power condition. Transient thermal storage can be caused, for example, by passing clouds and off-sun periods at night. The above improvements can increase efficiency, dispatchability, lifetime and reliability of the entire system by mitigating or eliminating thermal transients.

For example, placing a coil or tube within the reflux boiler liquid will allow an external phase change loop of the same fluid, or a similar fluid, to extract heat from the boiling fluid. This heat can then be delivered to a separate external tank containing a similar variety of thermal energy storage (TES) PCMs to provide long term energy storage. The tank could be used as a pedestal to mount the parabolic dish, which would reduce the cost of the system. Using the tank as a pedestal also places the inlet to the long term storage tank in close proximity to the receiver exit. The proximity can minimize heat losses and costs, unlike long flexible lines carrying thermal energy. The charging and discharging of the thermal energy storage PCM can be carried out by the phase changing of the reflux boiler fluid in the spiral/helix tube, porous bed, or other geometries/configurations used to change the liquid into a vapor and the vapor into liquid. In other words, the two-way process can comprise boiling and condensation. Many TES PCMs exist, comprising $KNO_3$, $NaNO_3$, LiBr/KBr, $MgCl_2$/NaCl/KCl, Zn/Mg, and CuCl/NaCl, which have various operating melting points and different latent heats of fusion. Common, cost effective TES PCMs are $FeCl_2$/NaCl/KCl mixtures, whose phase change temperature can be varied and controlled by simple composition adjustments. Therefore, it is possible to design systems to accomplish TES temperature staging as shown in FIG. 1.

FIG. 1 describes in an exemplary graph how thermal energy storage (TES) can be improved by providing efficient heat transfer with minimal thermal energy losses. TES can be improved by controlling the heat transfer at several incrementally higher temperature levels. For example, in FIG. 1, three TES temperatures (105) are illustrated: low (115), mid (120) and high (125), corresponding to three working fluid temperatures (110). The graph illustrates temperature (130) versus flow length (135). In other embodiments, a different number of temperature stages, more or less than three, may be used.

The TES technology described in the present disclosure enhances the performance and marketability by: 1. enabling small parabolic dish solar concentrator technologies that can be used in rural or urban applications where there are existing grid transmission lines in place; and 2. enhancing large power tower systems, thereby reducing their levelized cost of electricity (LCOE). FIG. 1 shows an example of a temperature-staged TES configuration.

Figure 2:
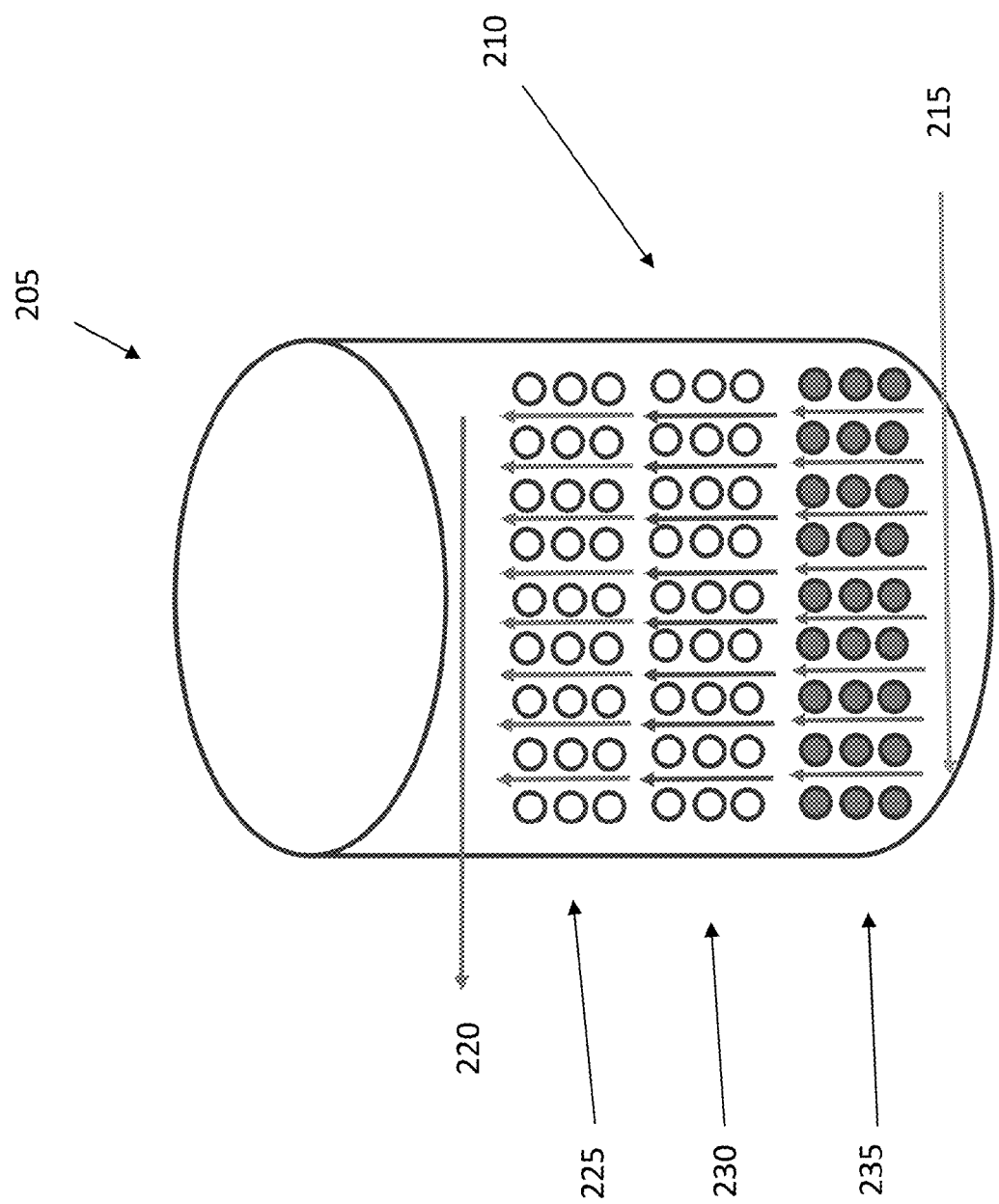
FIG. 2 illustrates an exemplary reflux boiler with particle beds.

The temperature-staged TES configurations can be directly integrated within the reflux boiling chamber, to provide the most direct heat transfer paths into or out of the TES materials, from/to the boiler working fluid. Some exemplary, anticipated temperature profiles and ranges for the working fluid (110) are shown in FIGS. 1 and 2, where large heat transfers are possible with low temperature differentials. For example, FIG. 2 illustrates an exemplary reflux boiling chamber (205) with porous particle beds (210). The working fluid flow is indicated by arrows (215) for the cold fluid entering the chamber, and (220) for the hot fluid exiting the chamber to then enter the thermodynamic power cycle. For example, three different temperature ranges for TES at the particle beds could be: low (330-350° C.), mid (350-380° C.) and high (380-400° C.).

Porous bed configurations and porous cylindrical tube configurations can both produce high transfer rates into and out of the TES, which is an advantage from the TES performance perspective. The porous beds can have the TES spherical elements arranged in distinct temperature-staged layers, as shown in FIG. 2. In other embodiments, the spherical elements are homogeneously mixed, depending on the system requirements. Similarly, the TES cylindrically tubes could be arranged in distinct temperature-staged layers or homogeneously mixed depending on the system requirements.

The temperature staging allows the working fluid to extract thermal energy at increasing temperatures as it heats up, thereby allowing heat to efficiently transfer at low temperature differentials during the heat up process. This process helps to maintain thermal energy in the system by eliminating heat transfer at higher temperatures differentials. Placing the TES system directly within the working fluid also helps ensure the low thermal energy loss mechanism described above. The working fluid ultimately leaves the reflux boiler or TES to supply the associated thermodynamic power cycle of the hybrid FSSS, thereby supplying the heat source for power production during no-sun, low-sun conditions. For example, the working fluid may be heated or vaporized in the TES before being directed to the thermodynamic power cycle. By using the TES, a heated working fluid can be supplied to the thermodynamic cycle throughout the day, regardless of outside solar conditions.

In some embodiments, the reflux boiler of FIG. 2 can be filled with liquid naphthalene covering the particle beds, while naphthalene vapor can fill the remaining volume of the chamber above the particle beds.

An innovation in the approach described in the present disclosure is locating the TES materials directly inside the reflux boiler design. Such location allows a lighter weight, more compact system with a higher performance (lower thermal energy loss), because the point of heat transfer is in direct contact with the working fluid. Such feature, combined with the highest temperature TES material in the system, also provides a thermal switch for the system. In fact, the highest temperature stage of the TES can serve as a safety-enhancing thermal storage point that provides more recovery and reaction time to any undesirable thermal transients emanating from unanticipated equipment failures, process anomalies, or overall cooling losses or disconnections in a hybrid FSSS. For example, a failure or temporary shut down in the thermodynamic power cycle of the hybrid FSSS could create a cooling loss or process anomaly that the system is not expecting. The working fluid stored at the highest temperature in the TES can allow a faster recovery time after occurrence of this unexpected anomalies in the power generation cycles, because it can prevent system damage. The thermal switch feature of the highest temperature TES can also allow a longer period of time for the system operators to place the system in a safe configuration after a power block anomaly.

The TES/reflux boiler configuration described above could be adapted to any concentrating solar power system in a variety of terrestrial and space power systems of interest, such as NASA missions. For example, different TES materials and configurations can enable highly efficient power and thermal management systems for Lunar and Mars habitat missions. Hybrid solar and thermodynamic cycle systems employing advanced TES configurations and concepts can allow NASA to most efficiently utilize the available energy in Lunar and Mars habitat missions and make these facilities more self-sufficient and robust. These systems could easily be adapted to fuel cell power systems that are using their waste exhaust heat to supply habitat heating and thermal comfort needs. By storing the waste exhaust of fuel cells, the TES system can lower the duty cycle and overall fuel usage of the cells.

Figure 3:
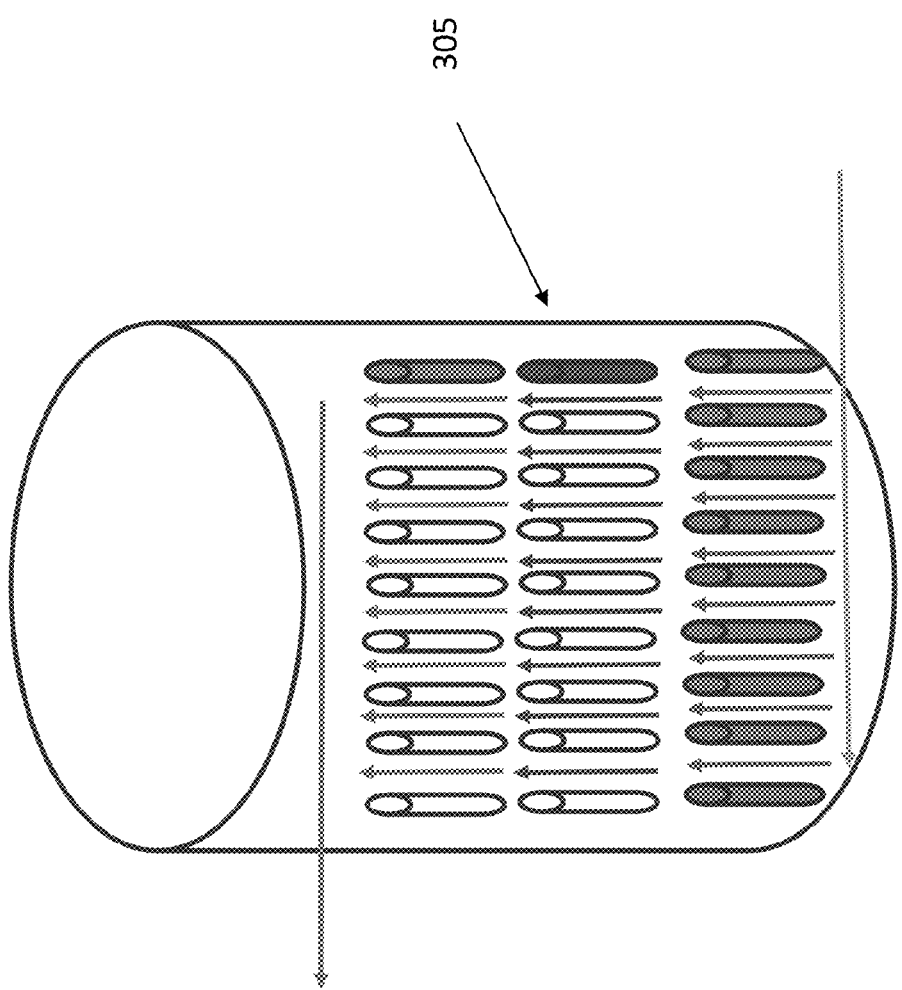
FIG. 3 illustrates an exemplary reflux boiler with tubes.

FIG. 3 illustrates an exemplary embodiment of a reflux boiler where the particle beds are replaced with porous cylindrical tubes. In FIG. 3, the tubes are aligned vertically, however in other embodiments the tubes may be placed in other alignments, such as horizontally, and may also be mixed instead of divided into individual, separate temperature stages. In some embodiments, the porous particles or tubes are porous to the working fluid to allow a more efficient heat exchange.

Figure 4:
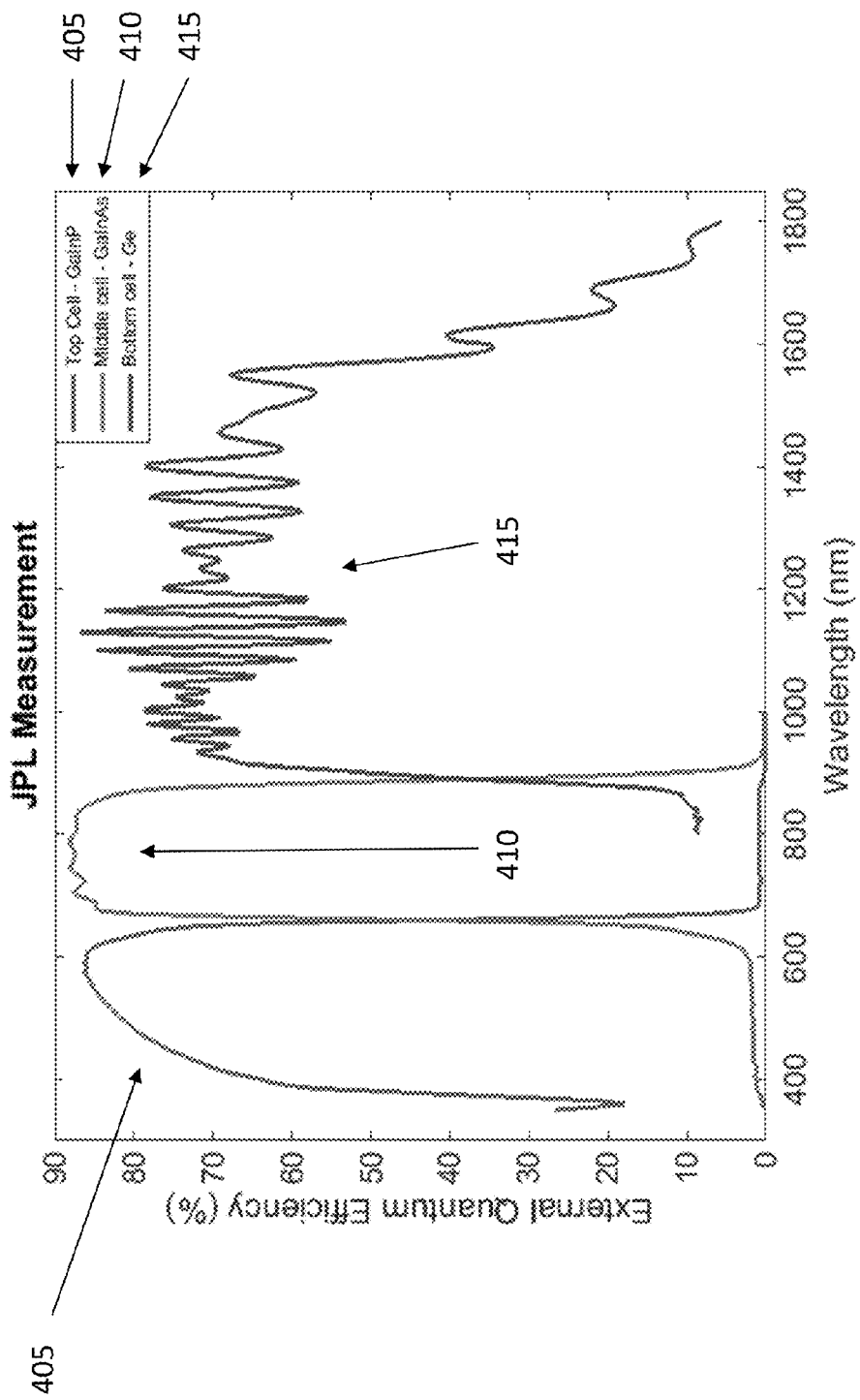
FIG. 4 illustrates data for an exemplary solar cell.

FIG. 4 illustrates exemplary measurements for the external quantum efficiency of a C3MJ three-junction concentrator solar cell at room temperature. The top cell (405) of GaInP operates at shorter wavelengths, the middle cell (410) of GaInAs at mid wavelengths, and the bottom cell (415) of Ge at longer wavelengths.

As an example a reflux boiler according to the present disclosure can demonstrate a boiling heat flux of 20 W/cm$^2$ over $\Delta T=16°$ C. at a saturation temperature $T_s$ of 350° C. in the reflux boiler with naphthalene as a working fluid. The system can also demonstrate a condensation heat transfer coefficient greater than $4.0\times10^3$ W/m$^2$-C over $\Delta T=5$-$9°$ C. on heat absorption tubes in a representative TAPC hot heat exchanger.

In other embodiments, Dowtherm™ A, NaK, Cs, K or other fluids may be used in the reflux boiler. Helium may be used with direct CPV gas cooling, while NaK can be used with a higher-temperature flow boiling design. An advantage of the reflux boiler design is the nearly isothermal CPV conditions, which efficiently transfers thermal energy at low energy levels because of its inherent isothermality. Its operation can also be passive with no pumping power applied.

The fluid selection is dependent on the boiling and condensation heat transfer characteristics (i.e., heat transfer coefficients, fluxes, and operating temperatures) useful for the specific system. The melting and boiling points for naphthalene at 1 atm are 80° C. and 218° C. The points for Dowtherm™ A are 12° C. and 257° C. Both fluids can operate at 350° C., for example, with naphthalene at about 162 psi operating pressure, and Dowtherm™ A at a lower 76 psi operating pressure. Therefore, in some embodiments, naphthalene can be used, providing higher margins of system performance on both boiling and condensation surfaces. The higher freezing and melting point is not a concern as it can be taken care of with a modified start-up procedure. The boiling and condensation heat transfer coefficient of the working fluid are used to predict system-level performance, determine surface area and sizing requirements of the system. In some embodiments, the temperature differential between the receiver cavity surface and the boiling fluid at saturation can be about 16° C. In some embodiments, the temperature differential between the boiling fluid at saturation and the TAPC hot head heat exchanger surfaces can be between 5 and 9° C.

Figure 5:
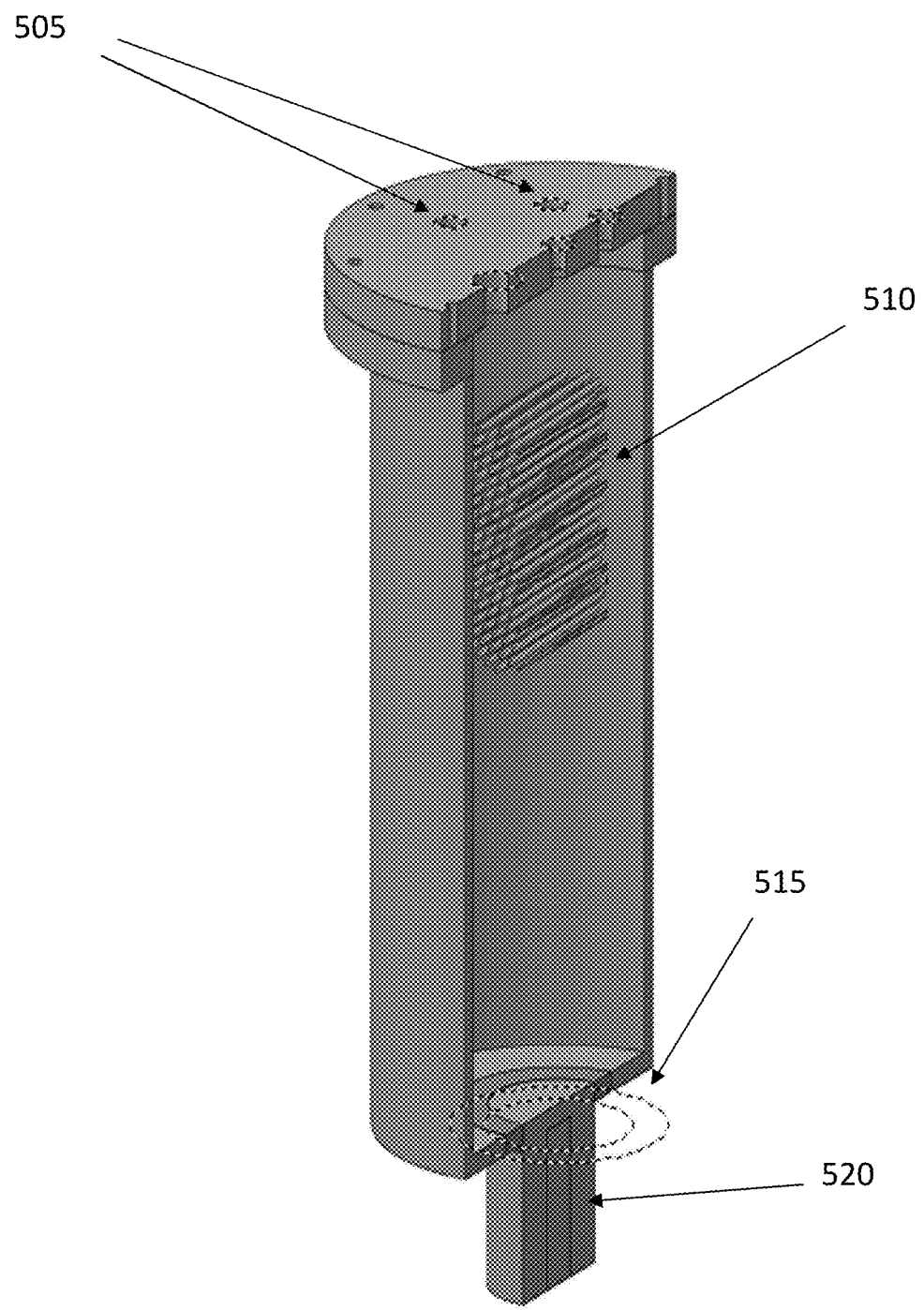
FIG. 5 illustrates an exemplary boiler system.

FIG. 5 illustrates an exemplary boiler system. The boiler comprises multiple openings or ports (505), for measurements and fluid flow. In this example, naphthalene is used as the working fluid in this reflux boiler. Condensing tubes (510) are illustrated within the boiler. In this example, the boiling surface (515) has a maximum thermal input of 900 W with a 49 W/cm$^2$ heat flux capability. The heater block (520) can provide up to 900 W. The heat transfer results obtained from testing the chamber in FIG. 5 can be scaled for differently sized boilers by the chamber and tube diameter, with a scale factor of about $1/d^{0.25}$. The boiler can be oriented at different angles, for example up to 30° in either direction. In some embodiments, the boiler can be of stainless steel and the heater block of Cu.

In some embodiments, the system comprises condenser tubes which are designed for a high pressure drop, for example 34.7 psi, to ensure a uniform flow in the tubes from the low pressure drop manifold. For example, 16 tubes may be used. In some embodiments, the He flow within the tubes is about 0.5 g/sec (up to 1 g/sec maximum for short periods).

Figure 6:
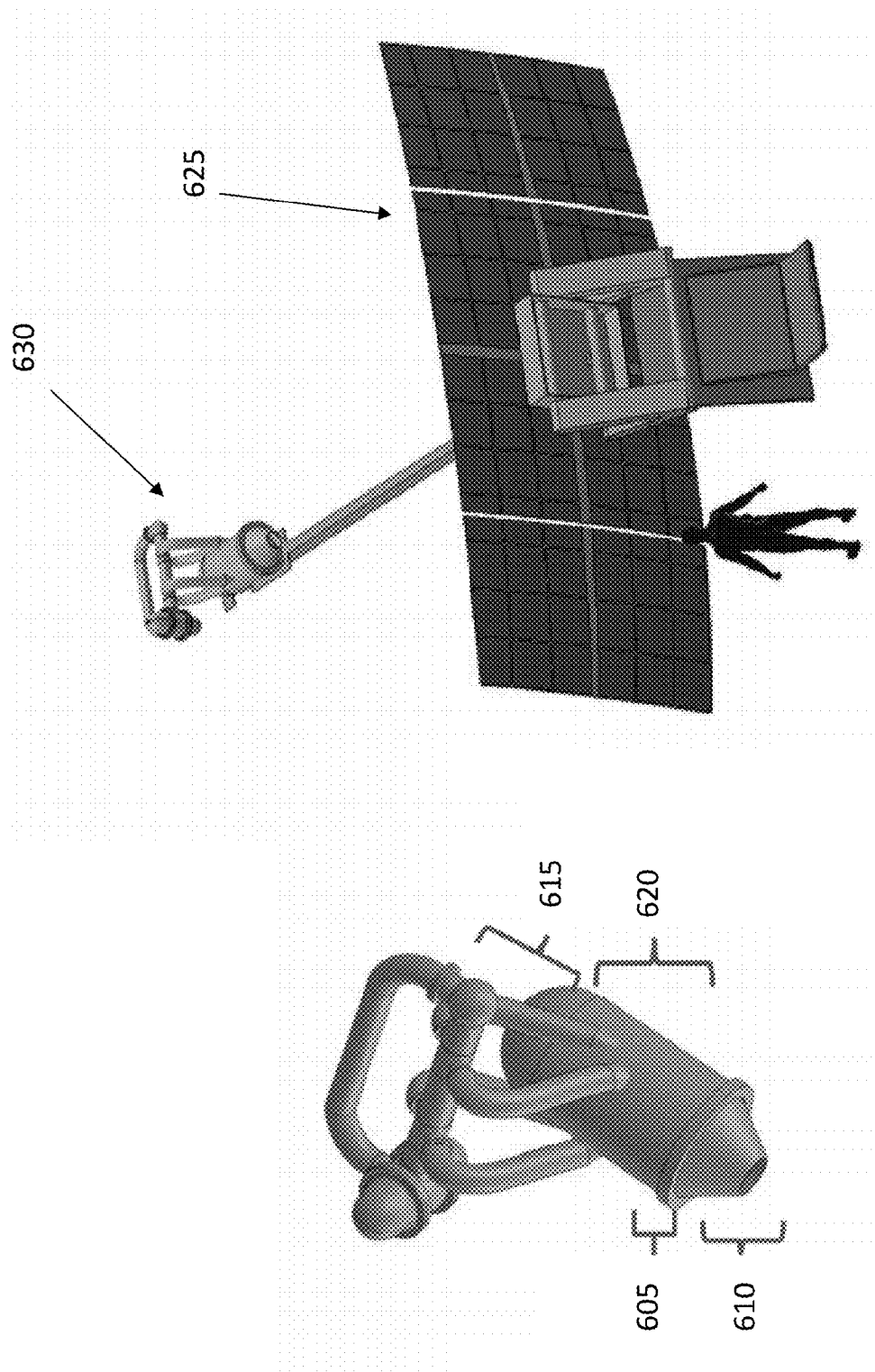
FIG. 6 illustrates an exemplary receiver cavity with TES.

FIG. 6 illustrates an exemplary receiver cavity and reflux boiler with TES. Solar radiation is focused (625) at the TES location (630). FIG. 6 illustrates an aperture plate (610), through which the solar radiation passes, a solar receiver cavity (605), a condenser section (615), where vapors condense, and a reflux boiler chamber (620). This is one embodiment showing how the solar receiver cavity can be integrated with the reflux boiler chamber filled with TES materials to deliver the solar thermal energy to the TAPC hot head heat exchangers.

Figure 7:
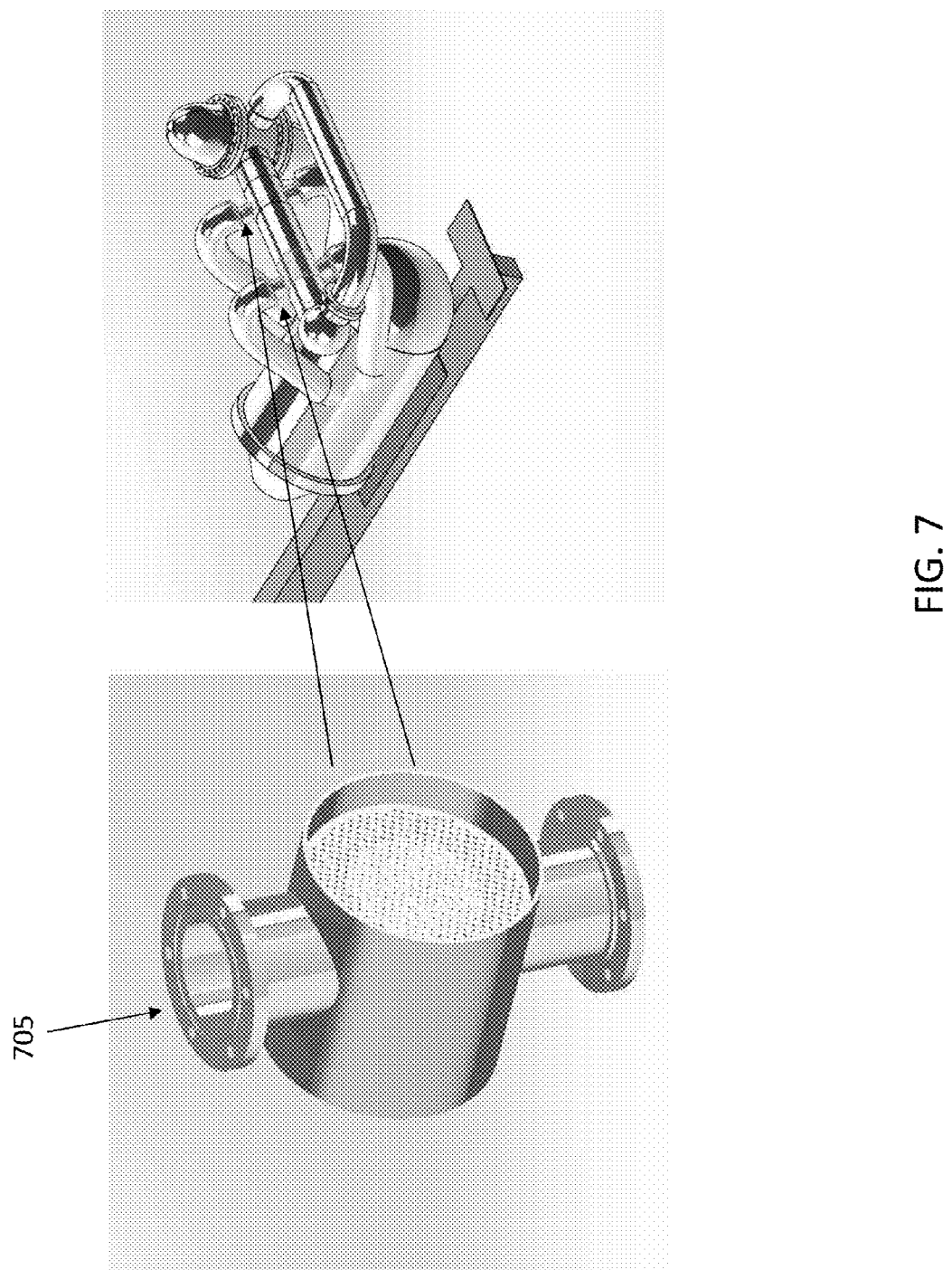
FIG. 7 illustrates an exemplary interface between the heat exchanger and the reflux boiler.

FIG. 7 illustrates an exemplary interface between the TAPC hot head heat exchanger and the reflux boiler. The working fluid, such as naphthalene, flows in the direction of arrow (705). In some embodiments, the condensing tubes (710) are angled at 22.5° relative to the naphthalene flow. In the example of FIG. 7, 524 tubes are used. Fans in the condenser section can be used to actively control the heat transfer on the condensing tube. The active mechanism allows the heat exchanger to clear condensate, and minimize the thickness of condensate films. In some embodiments, an internal propeller can be used, externally driven by a magnetic drive. In some embodiments a pump can be used which is hermetically sealed.

Figure 8:
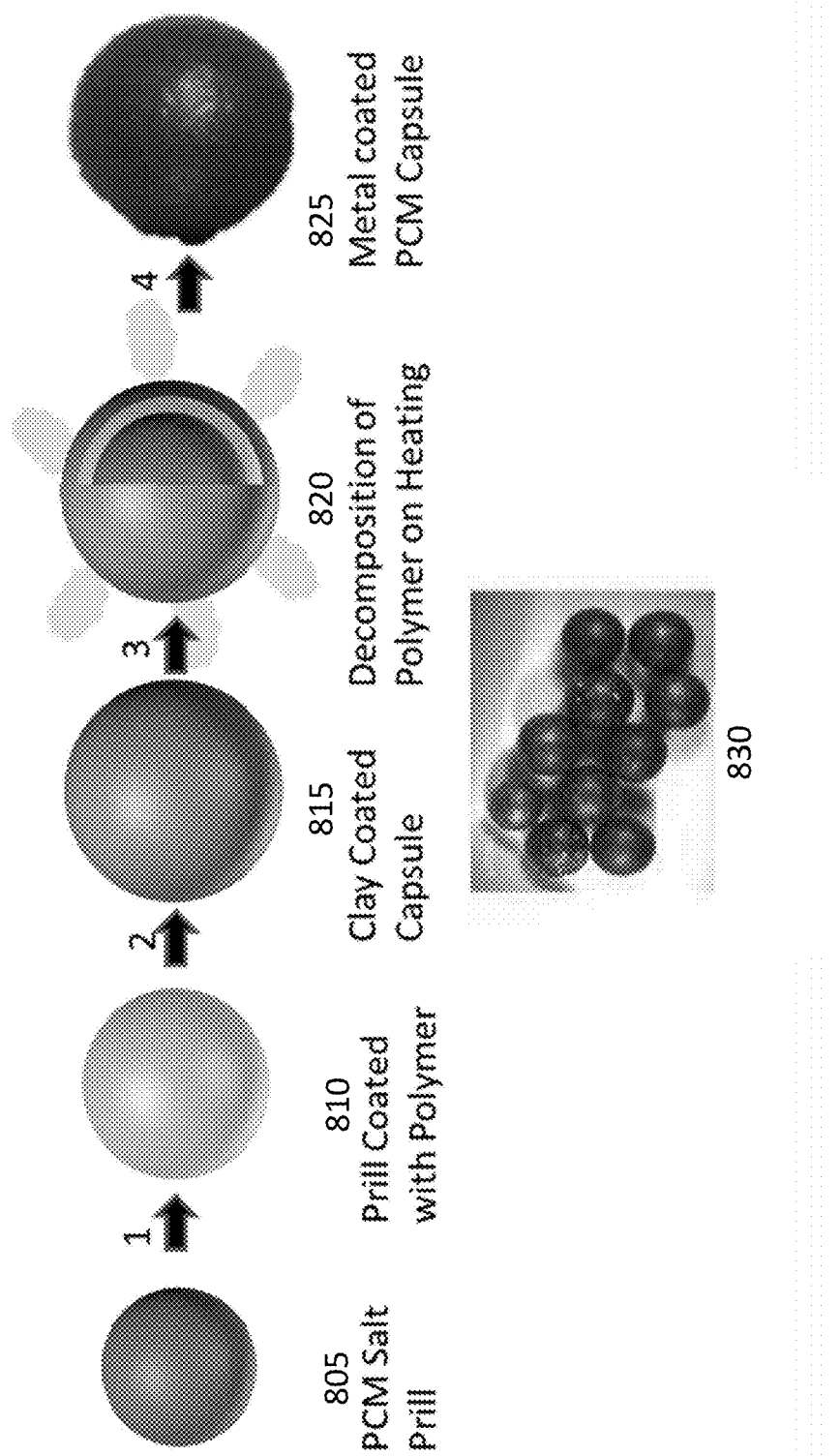
FIG. 8 illustrates exemplary capsules for TES.

FIG. 8 illustrates exemplary capsules made by Terra-Fore®, to be used in particle beds as discussed above. One advantage of small capsules is their large heat transfer area per volume. The fabrication process enables the creation of a void inside the capsules, to allow for expansion upon heating. For example, a phase change material (PCM) salt prill (805) is coated with a polymer (810), and subsequently with clay (815). Upon heating, the polymer will decompose (820), thus creating a volume in which expansion can take place. The capsule can then be coated with a metal (825). FIG. 8 illustrates exemplary nickel-coated capsules (830). In some embodiments, capsules as described in FIG. 8 and similar to those made by TerraFore® may be used in conjunction with the systems described in the present disclosure.

In some embodiments, for a TES capable of holding about 4.5 kW for 15 minutes, a total PCM weight of 57 kg may be used, with a total number of 1 inch diameter spherical capsules of 3310, and a total weight of polymer coating of 6 kg (200 kJ/kg). In another embodiment, 2451 capsules can be used, with a PCM weight of 42 kg and a polymer weight of 4.5 kg (300 kJ/kg). In other embodiments, 131 tubes with 1 inch diameter and a 0.45 m height can be used, with a PCM weight of 46 kg and a steel weight of 53 kg (200 kJ/kg); or 104 tubes with a PCM weight of 36 kg and a steel weight of 42 kg. In some embodiments, the TES salt capsules may comprise NaCl, KCl and FeCl$_2$.

Figure 9:
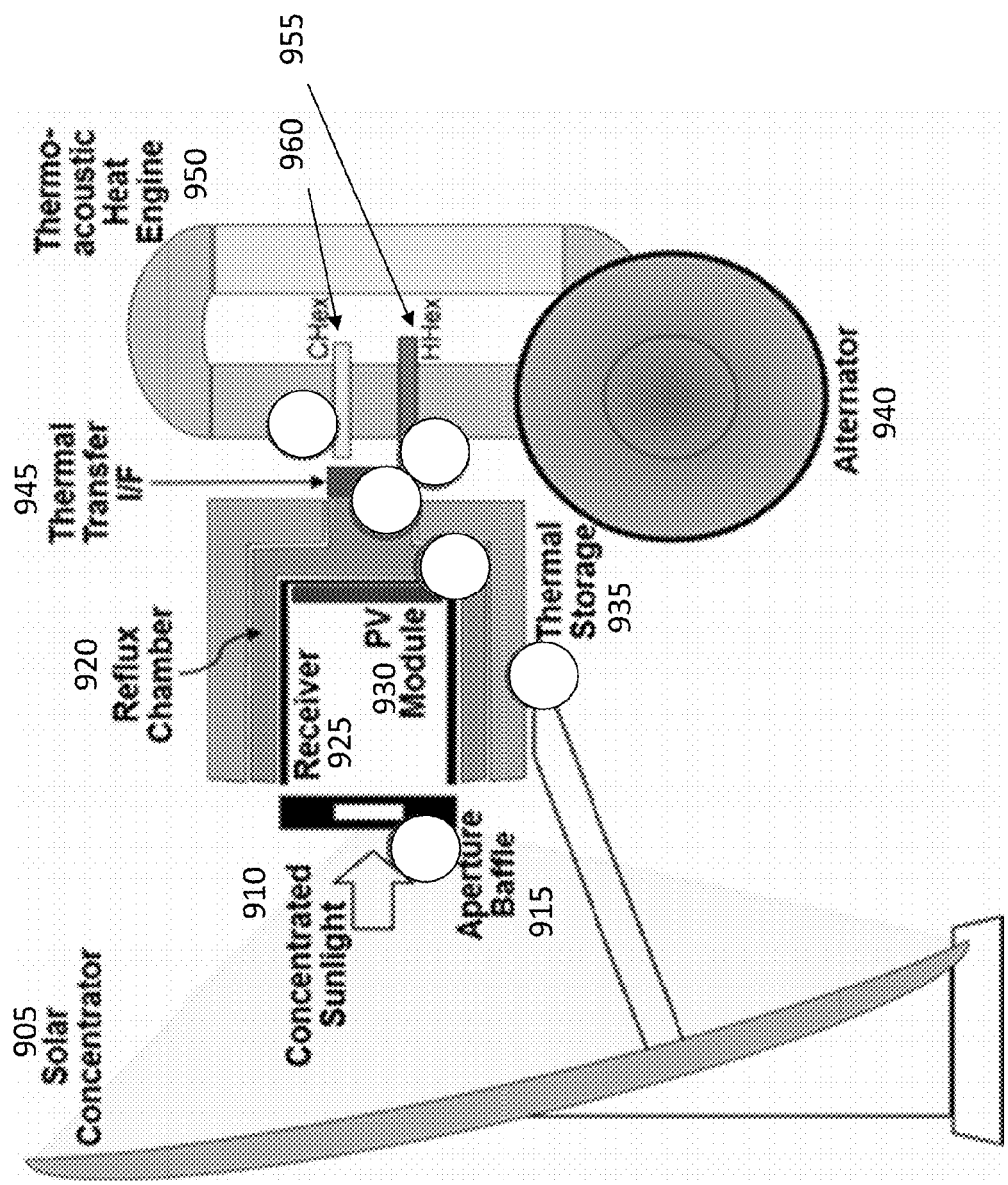
FIG. 9 illustrates an exemplary thermoacoustic power conversion (TAPC) system incorporating thermal energy storage (TES).

FIG. 9 illustrates an exemplary thermoacoustic power conversion (TAPC) system incorporating thermal energy storage (TES). A solar concentrator (905) can be used to concentrate sunlight (910) onto the aperture baffle (915). A photovoltaics module (930) inside the receiver (925) can capture and convert energy at low wavelengths. The thermal storage (935) system with the reflux chamber (920) can surround the receiver (925). The solar cavity and reflux boiler can capture and convert energy at high wavelengths. A thermal transfer (945) connects to the thermoacoustic heat engine (950). An alternator (940) is also illustrated. The reflux boiling system allows efficient, low-energy-loss heat transfer throughout this system from solar cavity to TAPC hot head heat exchanger. The TAPC captures and converts thermal energy at longer wavelengths. The TES integrated in the reflux boiling system allows storage of thermal energy.

In some embodiments, the solar concentrator is a parabolic dish, and the photovoltaics module is a high-temperature multi junction solar photovoltaic (MJSPV) cell. For example, the multi junction solar photovoltaic cell can absorb wavelengths of 1.1 to 1.2 µm, while the remaining portion of the solar spectrum (infrared wavelengths and wavelengths longer than 1.2 µm) is absorbed as thermal energy in the reflux boiler chamber integrated with TES materials. The reflux boiler can absorb the large thermal loads (e.g., 18 kW) via low-thermal-energy boiling processes, and can transfer this heat to the hot-head of the TAPC via low-thermal-energy condensation processes in the TAPC hot-head heat exchanger (955). The TAPC can then convert the incoming thermal energy (which is essentially the initial solar spectrum not converted by the MJSPV cells) by operating between its hot-head heat exchanger (955) conditions (e.g., at about 350° C.) and its cold-side heat exchanger (960) conditions (e.g., at about 45° C.). The reflux boiler, in some embodiments, can be designed to deliver 18 kW$_{th}$ (thermal energy) to the TAPC hot-head heat exchanger with approximately 20° C. of temperature differential between the reflux chamber boiling surfaces and the TAPC hot-head heat exchanger surfaces.

The exemplary system of FIG. 9 allows increased performance in power and efficiency, and increased dispatchability for longer off-sun operation. The increased performance leads to lower LCOE costs. In some embodiments, an exemplary system may have greater than 10 kWe at 300-350° C. hot side, with a 37° reject temperature at giving greater than 25% TAPC efficiency. High-temperature PV efficiency may be greater than 20% at 350° C. with advanced solar cells currently under development. Overall system efficiency may exceed 44%. The system has low-energy-loss thermal transport into the TAPC, and low-energy-loss thermal transport into and out of the TES.

In an exemplary operating scenario, the system may be collecting solar energy, generating electrical power, and storing heat in the TES simultaneously. During an off-sun period, such as a cloud obscuring the sun for a period of time, the TES can output heat and allow continuous generation of electricity. The different stages and temperatures of the TES can be tailored to increase performance of the system. In some embodiments, several stages may be used in the TES, such as, for example, four stages at different temperatures. Different materials may be used for the TES, or even different materials for each stage of the TES. Possible materials may comprise $KNO_3$ and KCl; LiBr and KBr; $FeCl_2$, NaCl, and KCl; $CaCl_2$, KCl and LiCl. Low entropy choices for the materials also have the highest latent heat storage fractions. The minimization of entropy depends on material selection and the phase change temperature of the material. Lower $(C_{p,TES}/h_{lat,TES})$ and $(C_{p,Naph}/h_{lat,TES})$ ratios lead to lower entropy-generation (lower energy loss) designs. For the case of naphthalene, the following equation may be used to calculate the fraction of Carnot efficiency.

$$\eta_{frac-Carnot} = 1 - \left[\frac{C_{p,TES}}{h_{lat,TES}} + \left(\frac{m_{Naph}}{m_{TES}}\right) \cdot \left(\frac{C_{p,Naph}}{h_{lat,TES}}\right)\right] \cdot (T_f - T_i) \quad (1)$$

where the subscript Naph refers to naphthalene, and the subscript TES refers to thermal energy storage, according to the standard notation understood by the person of ordinary skill in the art. In the Eq. 1 above, $\eta_{frac-Carnot}$ is the fraction of Carnot efficiency during the energy storage/dissipation process; Cp (TES or naphthalene) is the heat capacity measured in J/kg-K; m (TES or naphthalene) is the mass of system constituents, measured in kg; $T_f$ is the final internal storage temperature during charging, measured in K; $T_i$ is the initial internal storage temperature during charging, measured in K; $h_{lat,TES}$ is the TES latent heat of fusion or latent energy of fusion, measured in kJ/kg or J/g.

In some embodiments, the 18 kW$_{th}$ thermal engine is operating at a stabilized temperature of 350° C. The thermal engine may work at different temperatures and have different input values, however these values are used as an example in the following.

In an exemplary operation, a cloud passes and blocks the solar input. The thermal engine keeps operating at a 18 kW$_{th}$ input and the temperature decreases until it reaches the melting temperature of the TES material. The reflux boiler contains sufficient TES material for a specifically tailored 15 minutes of operation, in one embodiment. The TES material is initially liquid and after 15 minutes, it has completely solidified and temperature keeps decreasing until it reaches 300° C. Once the temperature drops to 300° C., the receiver is again irradiated by the sun and the temperature increases until it reaches each of the melting temperature stages of the TES materials. At that point, each TES stage charges by liquefying while the temperature remains constant. The system can be designed for longer off-sun operation. The reflux boiler liquid, such as naphthalene, transfers heat to the TES materials.

The system entropy generation during the thermal storage process can be analyzed using the principles and concepts described in Howell and Buckius (Howell, J. R. and Buckius, 1987, R. O., Fundamentals of Engineering Thermodynamics, McGraw-Hill, Inc., New York) and Bejan (Bejan, A., 1996, Entropy Generation Minimization: The Method of Thermodynamic Optimization of Finite-Size Systems and Finite-Time Processes, CRC Press, Inc., Boca Raton), the disclosures of both of which are incorporated herein by reference in its entirety.

The hybrid solar system design incorporates the TES materials directly into the reflux boiler design; such that during the thermal storage process heat transfers directly from/to the reflux boiler medium (naphthalene) to the TES materials during discharging and charging. This work considers the naphthalene and TES materials starting from an initial temperature, $T_i=300°$ C. and heating to a final temperature $T_f$ during the charging process, with latent heat transfer occurring isothermally at the TES phase change temperature, $T_{TES}$ (between $T_i$ and $T_f$) during a constant temperature phase in the general heat up. The entropy generation during this thermal transfer is determined by considering both the naphthalene (N) and TES material entropy generation. It can be expressed by:

$$S_{gen,Naph} = S_{f,Naph} - S_{i,Naph} - \int_i^f \frac{dQ_N}{T} \quad (2)$$

$$S_{gen,TES} = S_{f,TES} - S_{i,TES} - \int_i^f \frac{dQ_{TES}}{T} \quad (3)$$

It can be recognized that $dQ_N=-dQ_{TES}$ during the entire energy storage process, including any during isothermal latent phase change heat transfer into/out of TES materials. One can use entropy relations as described in Ref. [15], and neglecting pressure changes during the storage process (these are generally small enough to neglect), to arrive at:

$$S_{f,Naph} - S_{i,Naph} = m_{Naph} \cdot C_{p,Naph} \cdot \ln\left(\frac{T_{f,Naph}}{T_{i,Naph}}\right) \quad (4)$$

$$S_{f,TES} - S_{i,TES} = m_{TES} \cdot C_{p,TES} \cdot \ln\left(\frac{T_{f,TES}}{T_{i,TES}}\right) \quad (5)$$

The total entropy generation during the TES storage process is then:

$$S_{gen,total} = S_{gen,Naph} + S_{gen,TES} \quad (6)$$

$$S_{gen,total} = m_{Naph} \cdot C_{p,Naph} \cdot \ln\left(\frac{T_{f,Naph}}{T_{i,Naph}}\right) + m_{TES} \cdot C_{p,TES} \cdot \ln\left(\frac{T_{f,TES}}{T_{i,TES}}\right)$$

The implicit assumption in the above equations is that $T_{f,Naph}$ is about equal to $T_{f,TES}$, and that the temperature differential between the naphthalene and TES is negligibly small. If the entropy generation associated with the heat transfer across a finite naphthalene-TES temperature differential is accounted for, then an additional entropy generation must be added to the Eq. 6:

$$S_{gen,HT} = \frac{\bar{h} \cdot A_{HT} \cdot (\Delta T_{Naph-TES})^2}{T_{Naph}^2} \quad (7)$$

One outcome from Eq. 6 is that lowering the final temperatures, $T_{f,Naph}$ and $T_{f,TES}$, generally lowers $S_{gen,total}$. Generally, using phase change TES materials to absorb the thermal energy during isothermal phase change (with latent heat absorption) in the storage process accomplishes this objective. Latent phase change heat absorption and dissipation under isothermal conditions also closely mimics Carnot-like, reversible conditions, thereby minimizing entropy generation because the heat transfer occurs during an isothermal storage process and $(S_f-S_i)$ terms go to zero. Using multiple phase change TES materials at multiple isothermal phases at different temperatures during the heating can further help to minimize temperature increases during TES heat absorption process, which also lowers $S_{gen,total}$ through Eq. 6.

Figure 10:
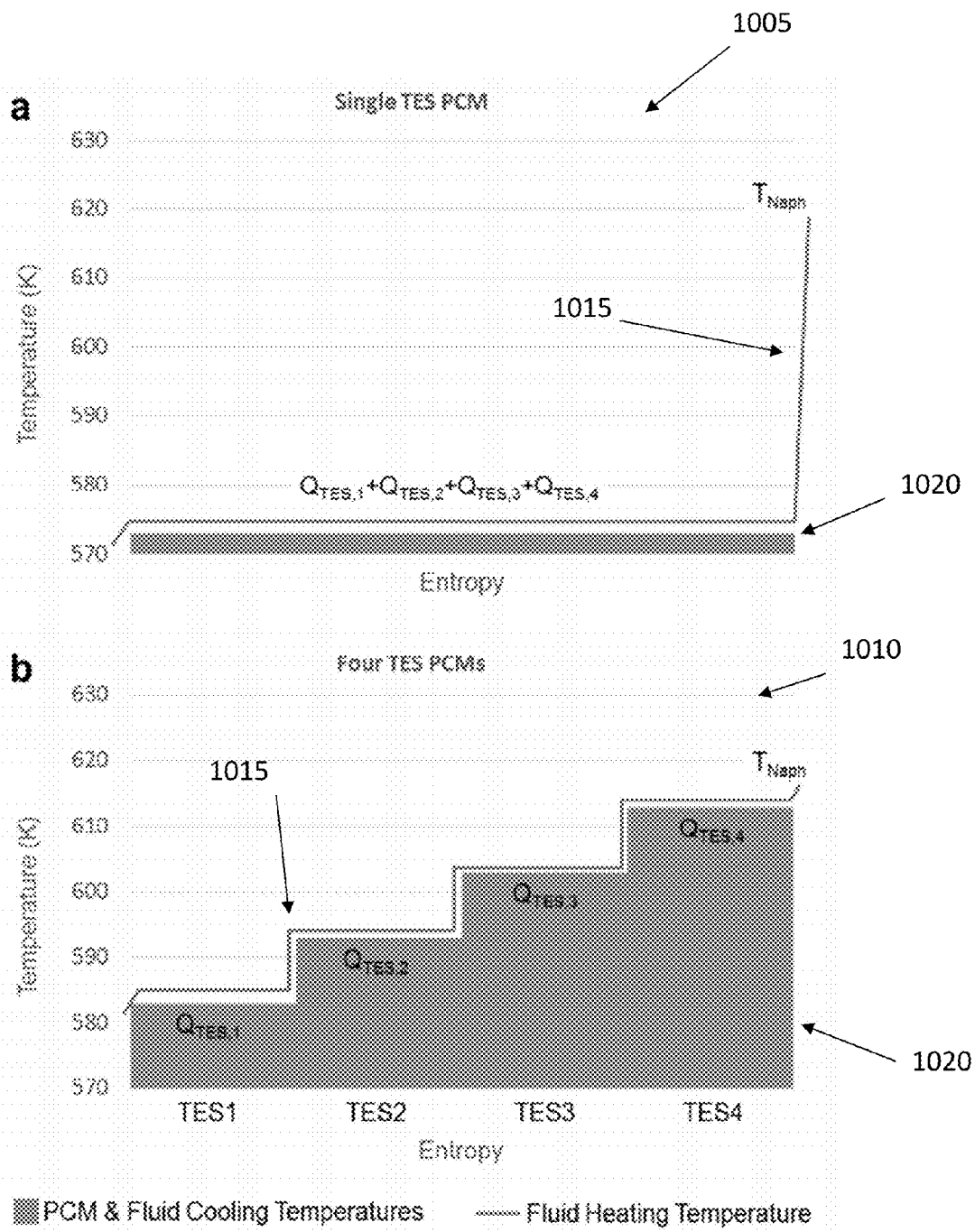
FIG. 10 illustrates TES phase change material comparison for single vs. multiple materials.

Furthermore, controlling and minimizing the $\Delta T_{naph-TES}$ during the heat transfer process also contributes to minimizing overall entropy generation in this system. For example, the minimization can be carried out as illustrated in FIG. 10, panel a (1005) and panel b (1010). The graphs show the temperature vs entropy for a single TES PCM (1005) or multiple TES PCM (1010). FIG. 10 panel b shows a higher efficiency, lower energy method of accomplishing the energy storage shown in FIG. 10 panel a, as is the subject of the present disclosure. The fluid heating temperature is graphed as a line (1015), while the PCM and fluid cooling temperature is shaded (1020).

Figure 11:
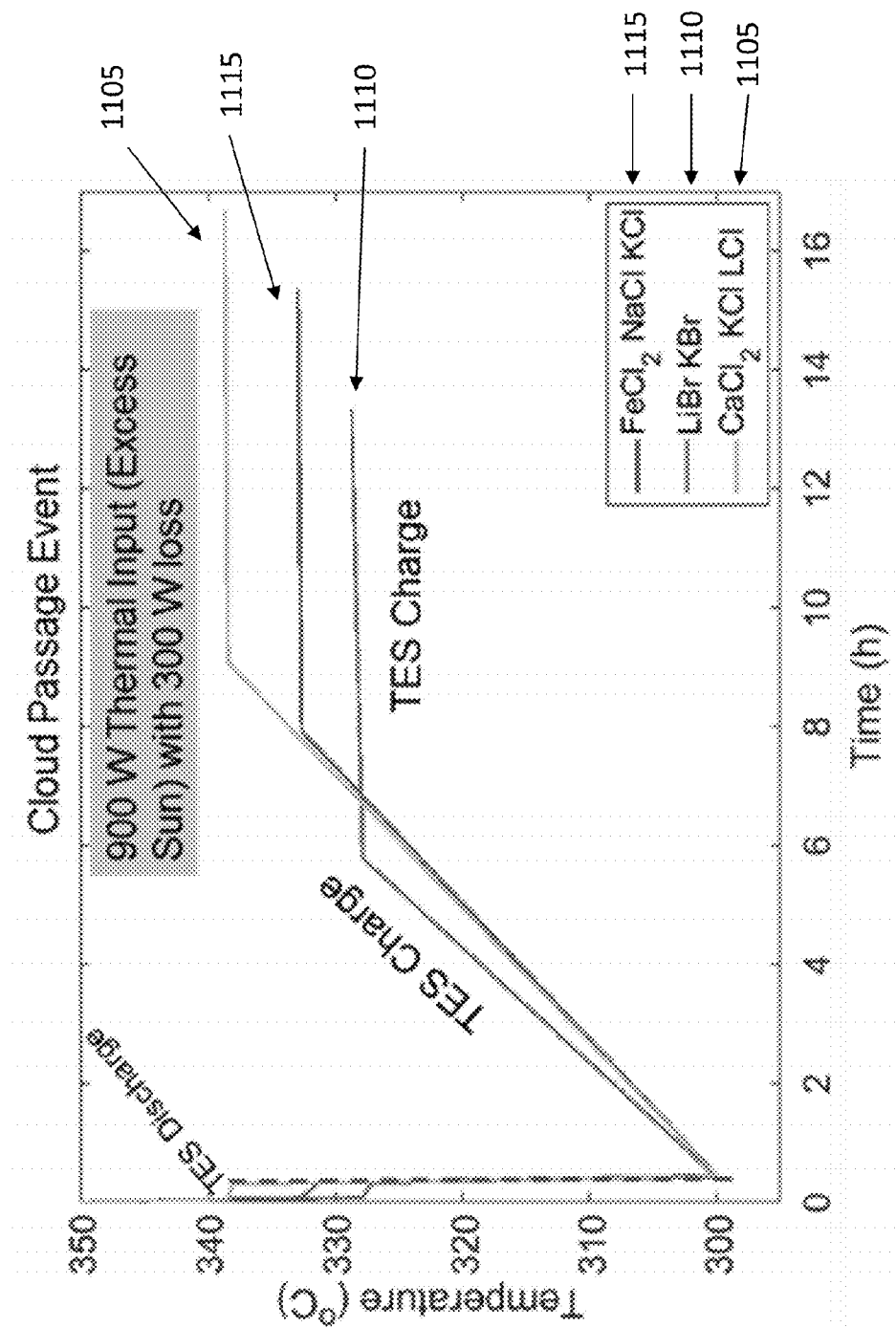
FIGS. 11 and 12 illustrate TES thermal analysis showing a cloud passage event.
Figure 12:
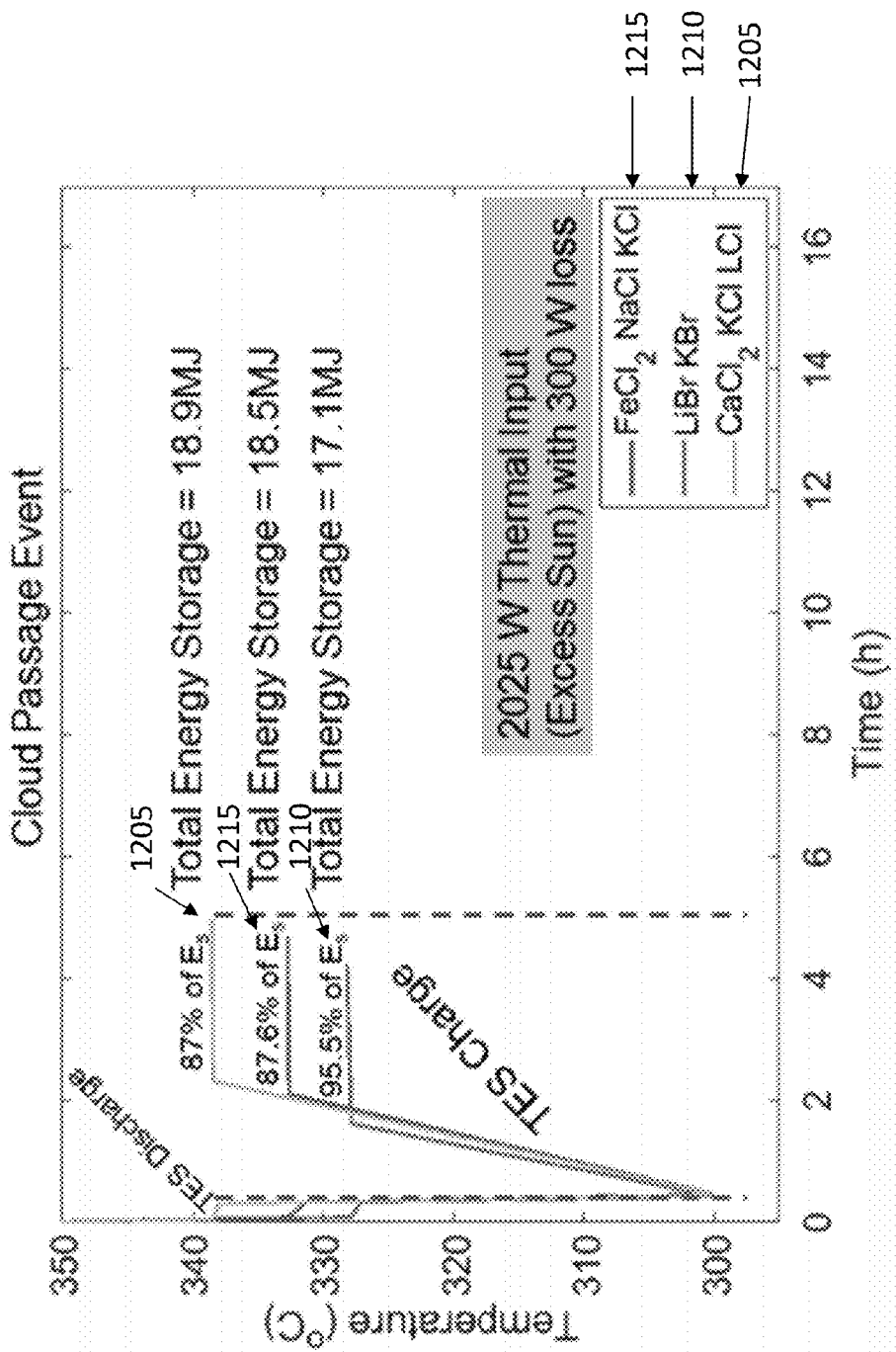

Different TES materials can be used. For example, in the following three different sets of TES materials with their different thermophysical properties are discussed: FeCl$_2$NaClKCl; LiBrKBr; and CaCl$_2$, KCl, LiCl. FIGS. 11 and 12 represent the described scenario for two different solar thermal input conditions during the TES charge phases. In this thermal analysis, the naphthalene-TES temperature differential, $\Delta T_{Naph-TES}$, is neglected as the envisioned detailed design is using special techniques to minimize this and thereby minimize the entropy generation (through Eq. 7). In FIG. 11, a 900 W thermal input with 300 W parasitic thermal loss is considered. This corresponds to the excess of solar input compared to and over and above the 18 kWth thermal input to the TAPC engine. The solar dish and receiver can be oversized to provide the excess solar input to charge the TES system when needed and appropriate. This design oversizing is controlled by trading off cost and value of the dish/receiver design, TAPC design, and TES design to arrive at the most optimum Levelized Cost of Electricity (LCOE), while realizing that the TES enables and increases dispatchability. The tradeoff is controlled by specific utility cost structures and what utility systems actually provide peak power.

In FIG. 11, FeCl$_2$NaClKCl (1115); LiBrKBr (1110); and CaCl$_2$, KCl, LiCl (1105) are illustrated, for a 900 W thermal input (excess sun) with a 300 W loss. LiBrKBr is the material that charges the fastest, but in this example it takes 5.3 hour for the temperature to rise to the melting temperature of 327.8° C. and 7.6 hours for the material to liquefy. That represents a total of almost 13 hours of storage charge time out of a potential full day of sun, which can be untenable for one operational day of sun. FeCl$_2$NaClKCl alone and CaCl$_2$ KCl LiCl alone can take longer than this period of time to fully charge, as can be deduced from FIG. 10. In this example, the excess-sun thermal input is too low, and shows the need to have a certain level of excess-sun thermal input (greater than 900 W) to make the thermal storage system viable.

In FIG. 12, a 2025 W excess solar input is considered, over and above the 18 kWth thermal input to the TAPC. In FIG. 12, FeCl$_2$NaClKCl (1215); LiBrKBr (1210); and CaCl$_2$, KCl, LiCl (1205) are illustrated, for a 2025 W thermal input (excess sun) with a 300 W loss.

In FIG. 12, the temperature rise time varies between 1.2 hours for LiBrKBr and 1.9 hours for CaCl$_2$, KCl, LiCl. The liquefying time is about 2.6 hours for all three TES materials. The liquefying time is equivalent for all three materials, in this example, because the amount of each material has been set for the same TES time, which is 15 minutes. The total TES charging time varies between 3.8 hours for LiBrKBr and 4.5 hours for CaCl$_2$, KCl, LiCl. These much shorter charge times are more realistic and viable for the expected operational day of sun in this concentrated solar power system. Based on the comparison between the three TES materials, LiBrKBr is the one that gives the shortest charge time, but it is also the most expensive. Even though FeCl$_2$NaClKCl is not the material that gives the shortest charge time; it is the least expensive and creates a good amount of energy storage. The above example is meant to illustrate an embodiment of the system. Any one or all of the materials considered in the example could be used in an actual system. The above example is meant to illustrate how the choice of material may be made based on cost as well as performance of the material.

Figure 13:
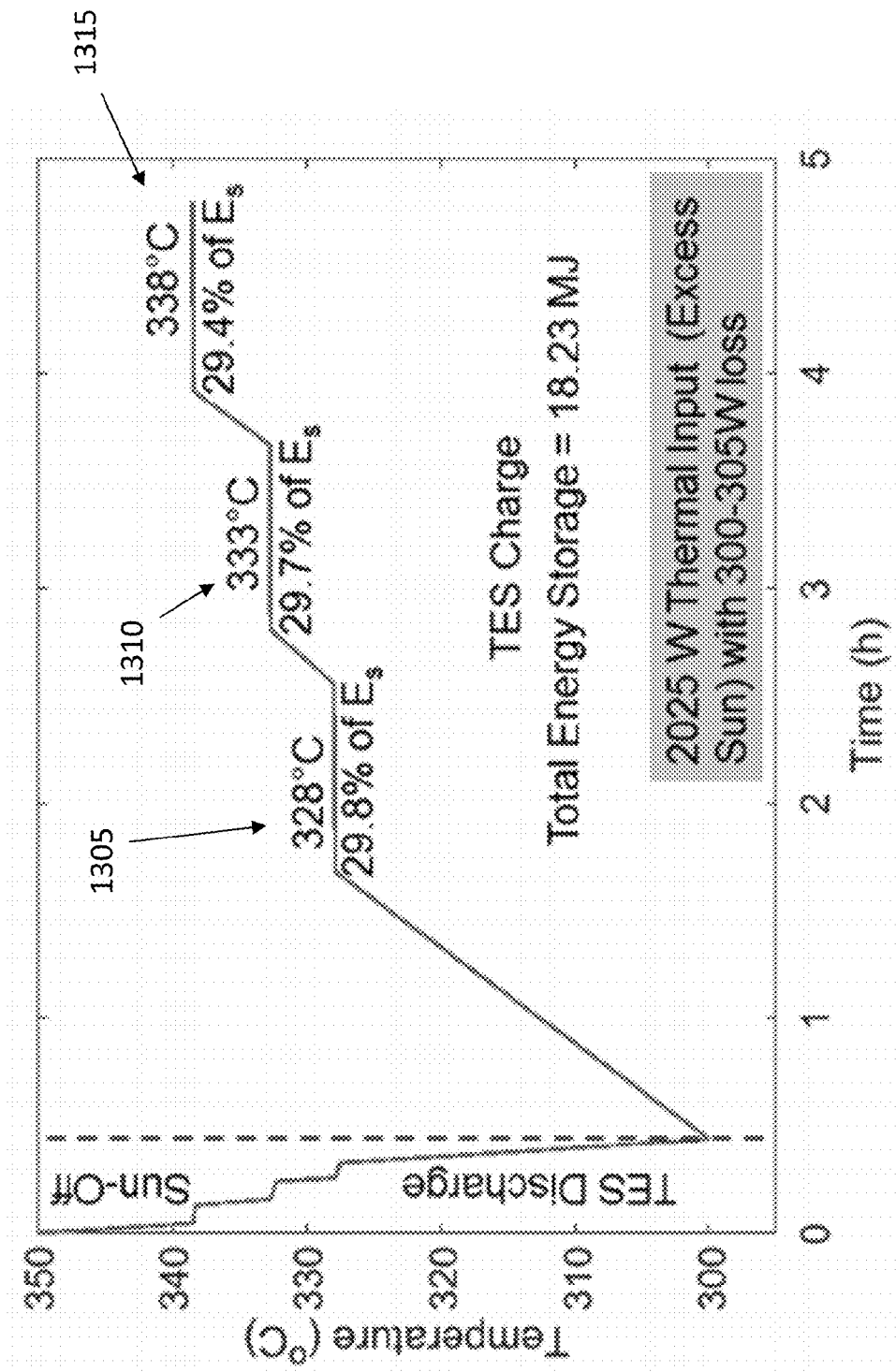
FIG. 13 illustrates multiple temperature-stage analysis showing TES discharge and charge for three TES materials.
Figure 14:
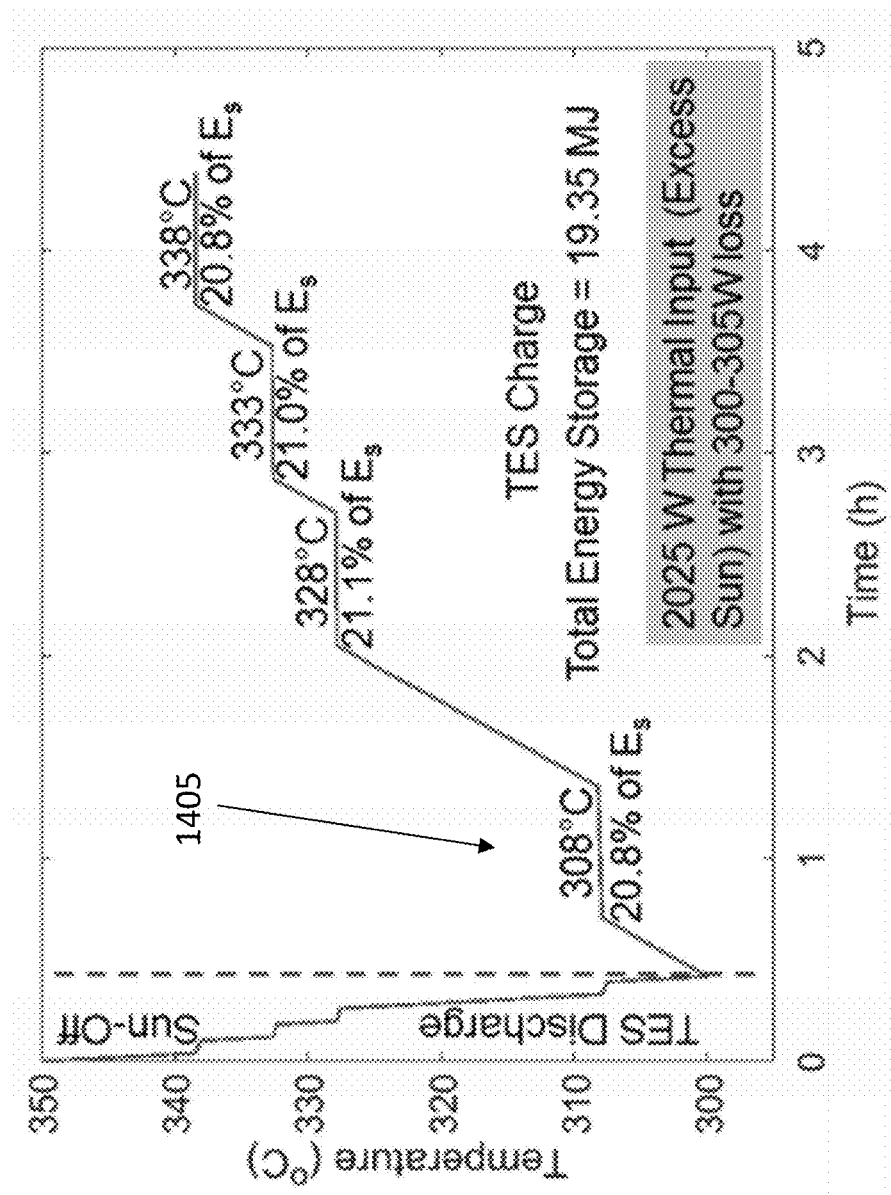
FIG. 14 illustrates multiple temperature-stage analysis showing TES discharge and charge for four TES materials.

FIG. 13 illustrates multiple temperature-stage analysis showing TES discharge and charge for three TES materials. FIG. 14 illustrates multiple temperature-stage analysis showing TES discharge and charge for four TES materials.

In the example of FIG. 13, the 15-minute TES is split into three TES materials with different melting temperatures, essentially staging the energy storage at three different temperature levels during the overall charge process. The temperature-staged analysis used the three materials that are independently analyzed in FIGS. 11 and 12. Using three materials with three different melting temperatures allows the charge or discharge to be carried out in incremental, isothermal steps. This method allows the system to store/dissipate thermal energy at multiple Carnot-like, reversible stages as the Reflux boiler/TES system increases/decreases in temperature. This method, therefore, allows the extensive thermal energy storage shown in FIG. 13 to occur for the minimum temperature excursions (increases/decreases), thereby minimizing the entropy generation given in Eq. 6, in addition to allowing the majority of the thermal storage energy transfer to mimic Carnot-like, reversible conditions.

The above method allows minimization of entropy generation (or thermal energy) for the temperature-staged-TES approach, along with specialized design techniques to minimize $\Delta T_{Naph-TES}$ as discussed above in the present disclosure. The method described above can lower the total thermal energy loss in the round-trip charge/discharge process with 90% of the total energy storage occurring in an isothermal phase change process in the PCM, and achieving a higher ultimate storage temperature if the proper TES materials are selected. During the course of the thermal analysis in FIG. 13 it was recognized that there could additional benefits to consider a lower temperature TES material to operate in the temperature gap between 300° C. and the first TES, LiBr/KBr, at 327.8° C.

For example, a fourth TES material with appropriate thermophysical properties, such as $KNO_3/KCl$, could be added. This exemplary material could be used as a lower temperature phase change material that would operate at 307.8° C. For example, its melting temperature is lower than the three materials used in the example above. FIG. 14 shows the discharge/charge temperature profile associated with a four-stage TES material design. The energy storage at each temperature stage indicates overall energy storage distributes throughout the intended discharge/charge process, In FIG. 14, the fourth TES material operates at a lower temperature (1405) compared to the three materials of FIG. 13. FIGS. 13 and 14 refer to a system with a 2025 W thermal input with a 300-305 W loss. Using four temperature stages, and four TES materials, as described in the example above, can give the benefits of storing the most amount of total energy, while providing the highest ultimate storage temperature of all the temperature-staged storage configurations considered. In other embodiments, though, a different number of materials may be used, as depending on what parameters are optimized, it may be advantageous, in some embodiments, to have different TES materials, and a different number of temperature stages.

As visible in FIG. 14, after about 4.5 hours, all four TES materials are fully charged with the excess solar thermal input shown. After that period of time, the temperature continues to increase until the operating temperature threshold of 350° C. is reached in the reflux boiler. At 350° C., the concentrator aperture or the solar reflector configuration can be adjusted to reduce the excess solar thermal input and thereby avoid system overheating, if necessary.

To optimize the system, the total energy stored, the latent heat storage fraction, the highest latent storage temperature obtained, the latent heat entropy from Eq. 7, and the sensible heat entropy from Eq. 6 can all be considered. To optimize the system, a high thermal storage capability and low entropy generation can be advantageous.

In several embodiments, the entropy generation associated with latent heat processes can be very small since energy is stored in near constant-temperature, Carnot-like processes. The entropy generation can be dominated, in several embodiments, by the entropy generation in sensible heat processes during the TES heating, as can be seen in Table 1.

Thermodynamic analysis of the energy storage process shows that Eq. 1 defines the fraction of Carnot efficiency that can be expected in the energy storage process, where $T_i$ and $T_f$ define the initial and final temperature conditions in the storage process. The storage process approaches a Carnot efficiency as $\eta_{frac-Carnot}$ approaches one. Eq. 1 shows that the ratio of $C_{p,TES}$ to $h_{lat,TES}$ shown in Eq. 8 is a controlling factor in determining the approach to Carnot efficiency and the lowest entropy cases. For example, some combinations of TES materials, such as LiBrKBr together with $FeCl_2NaClKCl$, or LiBrKBr together with $FeCl_2NaClKCl$ as well as with $CaCl_2$, KCl, LiCl, actually have the lowest $(C_{p,TES}/h_{lat,TES})$ ratio, thereby giving those cases the highest fraction of Carnot during the thermal energy storage process, and therefore leading to the lowest entropy generation conditions. Two extreme cases were also investigated, as an example: LiBrKBr by itself and $KNO_3$, KCl by itself. In the LiBrKBr case, the entropy generation analysis showed this option had the lowest entropy generation (sensible heat entropy generation 4717 J/K with negligible latent heat entropy generation) of all the cases investigated and this LiBrKBr material has the lowest $(C_{p,TES}/h_{lat,TES})$ of any materials studied herein. In the $KNO_3$, KCl case, the entropy generation analysis showed this option had the highest entropy generation (sensible heat entropy generation >15500 J/K with negligible latent heat entropy generation) and this $KNO_3/KCl$ has the highest $(C_{p,TES}/h_{lat,TES})$ of the materials studied herein.

The person of ordinary skill in the art will understand that, by applying Eq. 8, different materials can be chosen for a specific system. Safety issues should also be considered, as certain materials may react violently with the liquid chosen in the reflux boiler. The person of ordinary skill in the art will understand that trying to accomplish the magnitude of energy storage described herein without any TES phase change material could lead to the maximum entropy generation due to the large required temperature changes associated sensible energy storage alone.

Eq. 8 also illustrates the dependence of the Carnot fraction on certain design parameters for the integrated reflux boiler/TES configuration described in the present disclosure. The mass fraction, $(m_{Naph}/m_{TES})$ is a parameter that decreases the Carnot fraction as $(m_{Naph}/m_{TES})$ increases. Therefore, in some embodiments it can be advantageous to have higher TES mass and lower liquid (e.g. naphthalene) mass to decrease energy generation and approach Carnot-like processes. The $(C_{p,Naph}/h_{lat,TES})$ parameter also plays a similar role in reducing the Carnot fraction as the $(C_{p,TES}/h_{lat,TES})$ parameter discussed above. Lower $(C_{p,Naph}/h_{lat,TES})$ ratios increase the Carnot fraction and thereby lower the energy generation, just as the $(C_{p,TES}/h_{lat,TES})$ parameter does.

The above analysis also illustrates how the TES design configurations exhibiting high latent energy storage fractions can be associated with low entropy generation (i.e., low energy) systems. This consideration also aligns well with the characteristically low $(C_{p,TES}/h_{lat,TES})$ ratios in low thermal energy designs, as the latent heat storage tends to dominate the energy storage process, in several embodiments as can be seen from Table 1. High latent energy storage fractions means that the majority of thermal energy is being stored in isothermal latent heat absorption (and dissipation) processes, which are inherently low energy, Carnot-like processes. These two characteristic metrics are therefore indicators of low energy systems in the design approach with multiple TES described in the present disclosure.

It can be noted from the analysis above that simply adding additional temperature stages in the energy storage process does not necessarily lead to lower entropy generation. For example, the case with LiBrKBr together with $FeCl_2NaClKCl$ as well as with $CaCl_2$, KCl, LiCl, and the case with LiBrKBr together with $FeCl_2NaClKCl$, show some of the lowest entropy generation cases, with the first case having higher energy storage at higher temperatures closer to the exemplary storage temperature design requirement of 350° C. Adding $KNO_3$/KCl to the first case gives a higher entropy generation because $KNO_3$/KCl in this temperature-staged storage configuration have a high ($C_{p,TES}$/$h_{lat,TES}$) ratio. This high ratio increases the entropy generation in this configuration.

It is clear from the above discussion that it is necessary to properly select TES materials to operate at the temperature stages of interest in this temperature-staged energy storage configuration, to obtain optimum benefits. The TES optimization process is controlled by the ($C_{p,TES}$/$h_{lat,TES}$) and ($C_{p,Naph}$/$h_{lat,TES}$) ratios, the ($m_{Naph}$/$m_{TES}$) ratio, the TES operating temperature of interest, and cost and safety of these different TES materials. The optimization process can then be further constrained by the simple availability of various TES materials capable of operating at certain temperature ranges. Table 1 illustrates parameters for some exemplary TES materials, as calculated from the analysis performed above.

TABLE 1

|  | Total energy stored (MJ) | Latent Heat Storage Fraction (%) | Highest Latent Storage Temperature Obtained (° C.) | Latent Heat Entropy - Eq. 7 (J/K) | Sensible Heat Entropy - Eq. 6 (J/K) |
| --- | --- | --- | --- | --- | --- |
| TES23 | 17.86 | 0.9107 | 332.6 | 0.083 | 6482 |
| TES34 | 18.83 | 0.8584 | 338.4 | 0.1 | 7916 |
| TES234 | 18.23 | 0.8897 | 338.4 | 0.174 | 6716 |
| TES1234 | 19.35 | 0.8369 | 338.4 | 0.315 | 8164 |

In Table 1, TES23, TES34, TE234 and TES1234 are obtained by combining TES1: $KNO_3$/KCl; TES2: LiBrKBr; TES3: $FeCl_2NaClKCl$; TES4: $CaCl_2$, KCl, LiCl.

In some embodiments, the porous PCM tubes can have a similar structure to the capsules comprising a core PCM, an empty space, and an external metallic coating. In some embodiments, the thermal energy storage materials may be in capsules, spheres, tubes, ellipsoids or other discrete forms. Therefore, in some embodiments, the thermal energy storage materials are in discrete form. In some embodiments, the system stores thermal energy, and transfers it to the heat engine via the working fluid.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A structure comprising:
  a photovoltaic module;
  a reflux boiling chamber configured to store thermal energy, the reflux boiling chamber comprising a plurality of temperature staged thermal energy storage materials, each temperature staged thermal energy storage material comprising a porous phase change material and configured to operate at a different temperature range than the other temperature staged thermal energy storage materials in the plurality of temperature staged thermal energy storage materials, the reflux boiling chamber further configured to contain a working fluid;
  a thermoacoustic heat engine;
  an alternator connected to the thermoacoustic heat engine; and
  a solar concentrator configured to concentrate sunlight towards the photovoltaic module and the reflux boiling chamber,
  wherein the reflux boiling chamber is further configured to transfer the thermal energy to the thermoacoustic heat engine through the working fluid by cycling the working fluid between a liquid phase and a vapor phase.

2. The structure of claim 1, wherein the porous phase change material comprises a plurality of capsules.

3. The structure of claim 2, wherein each capsule comprises a core of the porous phase change material, an external metallic coating, and an empty space between the core and the external metallic coating configured to allow for expansion of the core.

4. The structure of claim 1, wherein the porous phase change material comprises a plurality of tubes.

5. The structure of claim 3, wherein the porous phase change material is selected from the group consisting of: $KNO_3$, $NaNO_3$, LiBrKBr, $MgCl_2$, NaCl, KCl, Zn, Mg, CuCl, $FeCl_2NaClCaCl_2$, and LiCl.

6. The structure of claim 1, wherein the plurality of temperature staged thermal energy storage materials comprises a low temperature thermal energy storage material, a mid temperature thermal energy storage material, and a high temperature thermal energy storage material.

7. The structure of claim 6, wherein the low temperature is configured to be between 330 and 350° C., the mid temperature is configured to be between 350 and 380° C., and the high temperature is configured to be between 380 and 400° C.

8. The structure of claim 1, wherein the photovoltaic module comprises a three stage solar cell, each stage operating at a different wavelength range.

9. The structure of claim 1, wherein the photovoltaic module is configured to absorb the sunlight at low wavelengths, and the reflux boiling chamber is configured to absorb the sunlight at high wavelengths, the high wavelengths being higher than the low wavelengths.

10. The structure of claim 6, wherein the reflux boiling chamber is configured to transfer the stored thermal energy to the thermoacoustic heat engine during off-sun operation.

11. The structure of claim 5, wherein the external metallic coating is nickel or stainless steel.

12. The structure of claim 6, wherein the working fluid is naphthalene.

13. The structure of claim 1, wherein each temperature staged thermal energy storage material is in discrete form.

* * * * *